(12) United States Patent
Bik et al.

(10) Patent No.: US 6,386,529 B2
(45) Date of Patent: May 14, 2002

(54) HYDRAULICALLY DAMPING ELASTOMERIC BEARING

(75) Inventors: Robert Bik, Koengen; Peter Tattermusch, Esslingen; Ulrich Zech, Magstadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/908,415

(22) Filed: Jul. 18, 2001

(30) Foreign Application Priority Data

Jul. 19, 2000 (DE) .......................................... 100 35 024

(51) Int. Cl.$^7$ .............................. B60G 11/22; F16F 1/44
(52) U.S. Cl. .................... 267/293; 267/140.13; 267/219
(58) Field of Search ................................ 267/293, 292, 267/219, 140.11, 140.12, 140.13

(56) References Cited

U.S. PATENT DOCUMENTS

| | | | | |
|---|---|---|---|---|
| 4,872,651 A | * | 10/1989 | Thorn .................... | 267/140.11 |
| 5,024,425 A | * | 6/1991 | Schwerdt ............... | 267/140.11 |
| 5,096,166 A | * | 3/1992 | Schwerdt ............... | 267/140.11 |
| 5,172,893 A | * | 12/1992 | Bouhier et al. ........ | 267/140.12 |
| 5,178,376 A | * | 1/1993 | Hamaekers et al. ... | 267/140.12 |

FOREIGN PATENT DOCUMENTS

DE 198 07 949 12/1998

* cited by examiner

Primary Examiner—Christopher P. Schwartz
Assistant Examiner—Devon Kramer
(74) Attorney, Agent, or Firm—Kenyon & Kenyon

(57) ABSTRACT

A hydraulically damping elastomeric bearing suitable for mountings in a motor vehicle includes an elastic block which is arranged between an outer sleeve and an inner sleeve coaxial thereto and which connects these elastically to one another, and at least two chambers which are filled with a liquid damping medium and communicate with one another via at least one throttle duct. In order to improve the damping properties of the elastomeric bearing, four chambers are provided, which are arranged in one plane, the four chambers each being arranged in one of four quadrants which are formed via two intersecting axes arranged in the plane, and that at least two throttle ducts be provided, via which at least one chamber which is arranged on a first side of the first axis communicates with at least one chamber which is arranged on a second side of the first axis, and via which at least one chamber which is arranged on a first side of the second axis communicates with at least one chamber which is arranged on a second side of the second axis.

12 Claims, 2 Drawing Sheets

HYDRAULICALLY DAMPING ELASTOMERIC BEARING

FIELD OF THE INVENTION

The present invention relates to a hydraulically damping elastomeric bearing suitable for mountings in a motor vehicle.

BACKGROUND INFORMATION

German Published Patent Application No. 198 07 949 describes an elastomeric bearing, in which an elastic block, for example, made of an elastic plastic or rubber, is arranged between an outer sleeve and an inner sleeve coaxial thereto. With the aid of this block, an elastic connection between the outer sleeve and the inner sleeve is made, which allows relative movements between the sleeves. The elastomeric bearing also has two chambers which are filled with a liquid damping medium and communicate with one another via a throttle duct. Elastomeric bearings of this type are used in order to mount a vibrating assembly on a non-vibrating holding device. The elastomeric bearings serve in this context for vibration insulation or vibration damping. For example, elastomeric bearings of this type are used in vehicle construction, in order to mount vehicle axles, a transmission or an engine on the vehicle body. In this case, one of the sleeves is connected to the vibrating assembly, whereas the other sleeve is coupled to the non-vibrating holding device. The vibrations of the assembly result in relative movements between the sleeves which reduce the volume of one chamber and simultaneously increase the volume of the other chamber. At the same time, the liquid damping medium is exchanged correspondingly between the chambers via the throttle duct. The throttling action of the throttle duct results in a damping of the relative movement and therefore in a damping of the vibrations capable of being transmitted between the sleeves.

Conventional elastomeric bearings have a working direction dependent on the application because of the selected arrangement of the chambers. Thus, a reduction in volume of one chamber with a simultaneous increase in volume of the other chamber is possible only in the case of those relative movements between the sleeves which have a direction component arranged parallel to the working direction. A conventional elastomeric bearing can accordingly damp hydraulically only those loads or vibrations which have a direction component arranged parallel to the working direction. In some applications of such elastomeric bearings, particularly in vehicle construction, however, different loads with different loading directions may occur. For example, on a vehicle, propulsive forces and braking forces, impacts and wheel-load changes in different directions may act on the respective elastomeric bearing.

It is an object of the present invention to provide an elastomeric bearing, in which a damping action may be achieved in a plurality of different directions.

SUMMARY

The above and other beneficial objects of the present invention are achieved by providing an elastomeric bearing as described herein. In one example embodiment of the present invention, a plurality of chambers are arranged in the elastomeric bearing and are connected to one another via corresponding throttle ducts so that two intersecting directions of movement are ensured and so that relative adjustment between the sleeves reduces the volume in at least one of the chambers and increases the volume in another chamber coupled thereto. Vibration damping may thereby be achieved for all directions of movement which are in a plane spanned by the intersecting directions of movement or axes.

According to an example embodiment of the present invention, each chamber which is arranged on a first side of the first axis and on a first side of the second axis may communicate, via a first of the throttle ducts, with a second chamber which is arranged on the first side of the first axis and on a second side of the second axis and, via a second of the throttle ducts, with a chamber which is arranged on a second side of the first axis and on the first side of the second axis. It is possible, by virtue of this arrangement of the chambers and throttle ducts, for one and the same chamber to be capable of being compressed in the two directions of movement arranged parallel to the axes. Furthermore, in such an example embodiment, it is possible to provide the first throttle duct and the second throttle duct with different throttling resistances, so that the damping action is more pronounced in the direction of one axis than in the direction of the other axis.

In connection with the present invention, the term "on this side" describes a position on one side, whilst the term "on that side" denotes a position on the other side.

According to an example embodiment of the present invention, one of the axes may be arranged coaxially to the sleeves of the elastomeric bearing. Axial loads on the elastomeric bearing are damped correspondingly.

In another example embodiment of the present invention, the inner sleeve of the elastomeric bearing may include at least one axial end portion, the outer contour of which includes an outside diameter increasing axially outwardly. By virtue of this arrangement, the inner sleeve may be fastened more effectively to a component to be connected thereto.

The outer contour of the axial end portion may delimit at least one of the chambers, thus resulting in intensive support and interaction between the respective chamber and the inner sleeve.

The features mentioned above and those explained below may be used not only in the combination specified but also in other combinations or alone, without departing from the scope of the present invention.

DETAILED DESCRIPTION

Figure 1:
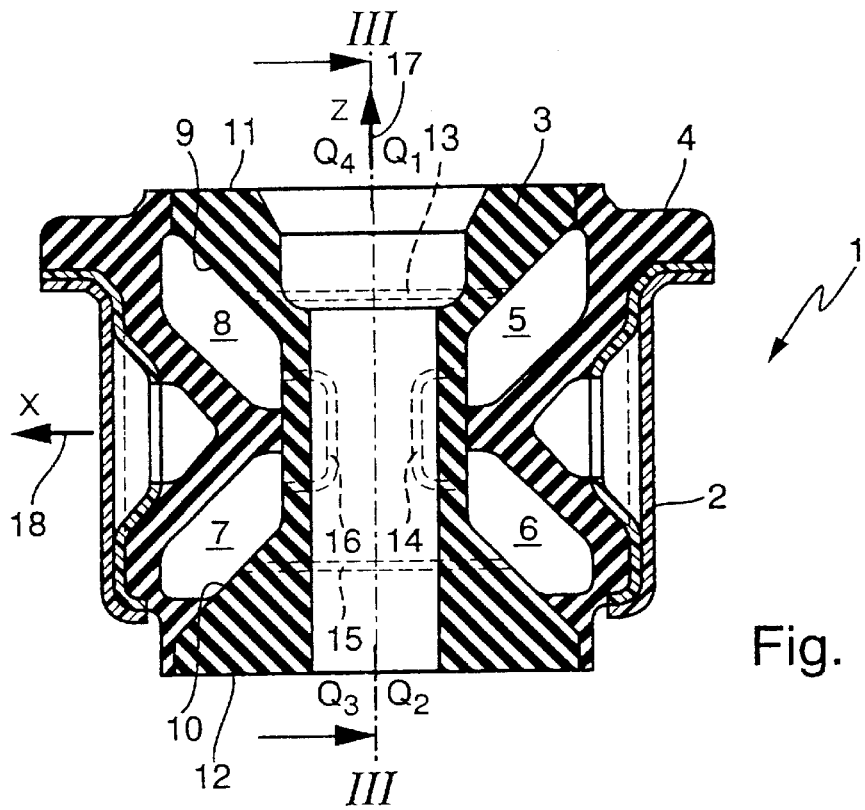
FIG. 1 is a schematic longitudinal cross-sectional view of an example embodiment of an elastomeric bearing according to the present invention.
Figure 2:
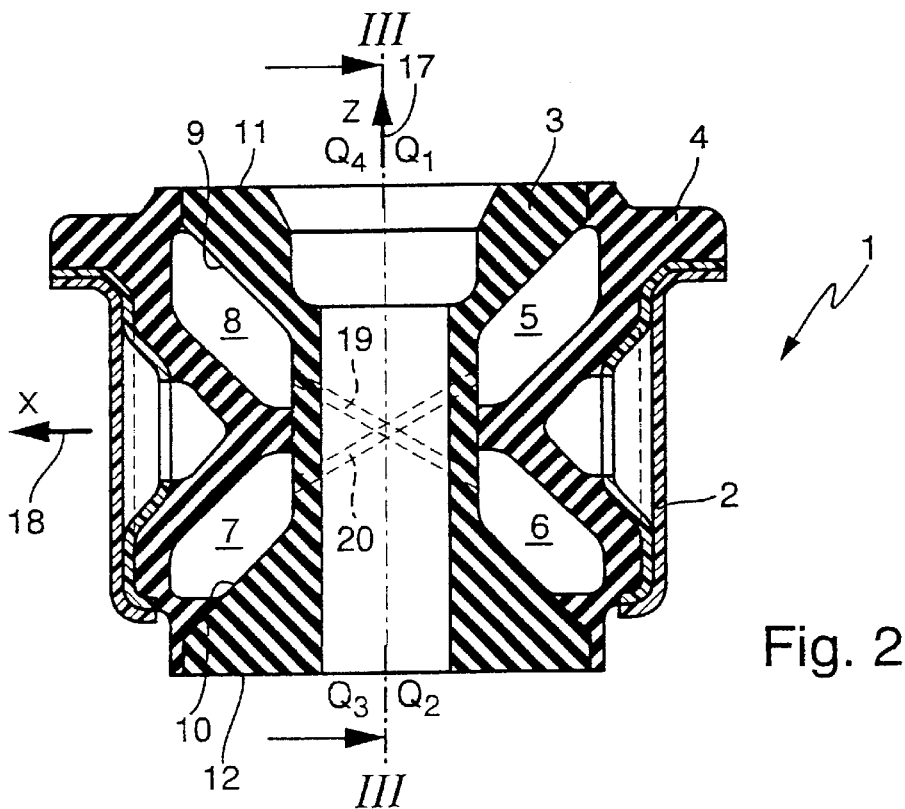
FIG. 2 is a schematic longitudinal cross-sectional view of another example embodiment of an elastomeric bearing according to the present invention.
Figure 3:
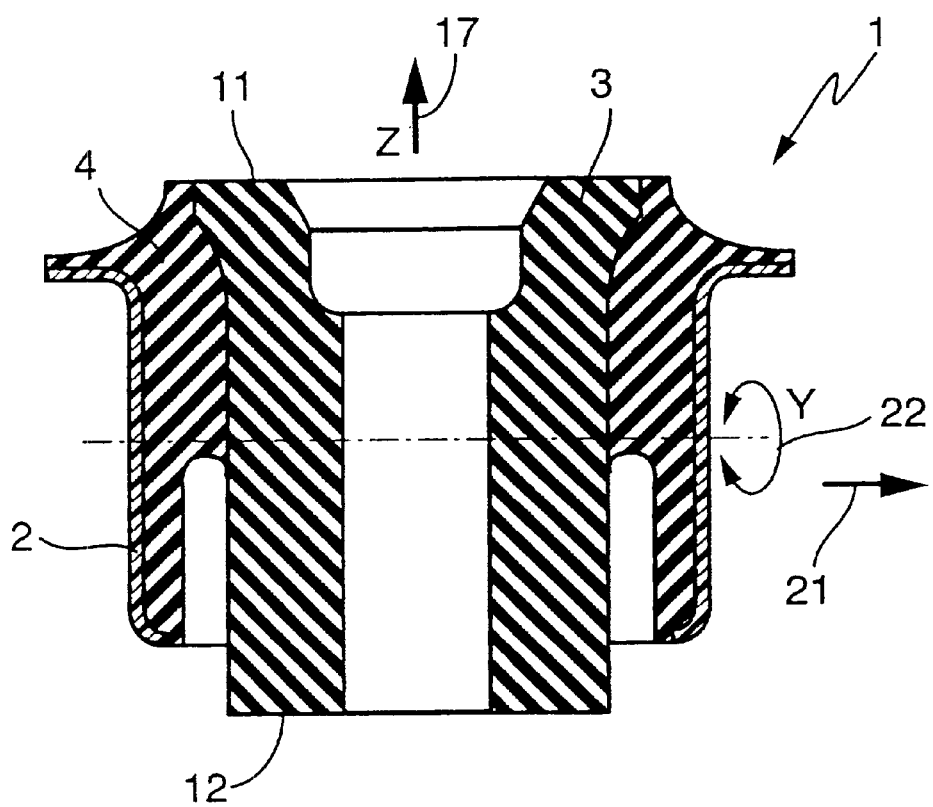
FIG. 3 is a schematic longitudinal cross-sectional view of an example embodiment of an elastomeric bearing according to the present invention taken along the line III—III illustrated in FIGS. 1 and 2.

As illustrated in FIGS. 1 to 3, an elastomeric bearing 1 according to the present invention includes an outer sleeve 2 and, coaxially thereto, an inner sleeve 3. Arranged radially between the outer sleeve 2 and the inner sleeve 3 is an elastic block 4 which connects the two sleeves 2 and 3 elastically to one another. For example, the block 4 may be vulcanized onto one of the sleeves or onto both sleeves 2, 3. Furthermore, the elastomeric bearing 1 includes four chambers, 5, 6, 7 and 8 which are filled with a liquid damping medium. In the example embodiments of the present invention illustrated, to form the chambers 5, 6, 7, 8, corresponding recesses are cut out in a region of the block 4 which faces the inner sleeve 3, so that the chambers 5, 6, 7, 8 are delimited radially inwardly by the outer face of the inner sleeve 3 and radially outwardly by the block 4.

As illustrated in FIGS. 1 and 2, the four chambers 5, 6, 7, 8 are arranged in one plane, i.e., in the drawing plane or sectional plane. A system of coordinates consisting of two axes which are perpendicular to one another and are designated by X and Z is arranged in this plane. The Z axis is arranged coaxially and concentrically to the sleeves 2 and 3. The two axes X and Z form four quadrants Q1, Q2, Q3 and Q4 in the XZ-plane. One of the chambers 5 to 8 is arranged in each of these quadrants Q1 to Q4. In the example embodiment of the present invention illustrated, the chambers 5 to 8 are arranged mirror symmetrically both with respect to the Z-axis and with respect to the X-axis. The axes X, Z may also intersect at an angle different from 90°.

The chambers 5 to 8, in their respective quadrants Q1 to Q4, are oriented parallel to an angle bisecting line of the respective quadrant Q1 to Q4. Moreover, the two axial end portions of the inner sleeve 3 are shaped so that their outer contours 9 and 10 include an outer cross-section increasing axially outwardly. The outer contours 9 and 10 have, for example, a conical configuration, a generatrix of the outer contours 9, 10 extending parallel to the angle bisecting lines of the respectively associated quadrants Q1 to Q4. In particular, these generatrices intersect at the intersection point of the axes Z and X. By virtue of this shaping of the inner sleeve 3, the latter possesses, on each of its axial end portions, a relatively large-area axial end face 11 and 12, via which a particularly stable support of the inner sleeve 3 on a component to be mounted may be achieved.

As illustrated in FIG. 1, four throttle ducts 13, 14, 15, 16 are provided, which connect two adjacent chambers 5 to 8 to one another. The arrangement of the throttle ducts 13 to 16 is selected so that the chamber 5 of the first quadrant Q1 communicates via the first throttle duct 13 with the chamber 8 of the fourth quadrant Q4 and via the second throttle duct 14 with the chamber 6 of the second quadrant Q2. Correspondingly, the chamber 6 of the second quadrant Q2 is connected via the second throttle duct 14 to the chamber 5 of the first quadrant Q1 and via the third throttle duct 15 to the chamber 7 of the third quadrant Q3. The chamber 7 of the third quadrant Q3 is coupled via the third throttle duct 15 to the chamber 6 of the second quadrant Q2 and via the fourth throttle duct 16 to the chamber 8 of the fourth quadrant Q4, whereas the chamber 8 of the fourth quadrant Q4 communicates via the fourth throttle duct 16 with the chamber 7 of the third quadrant Q3 and via the first throttle duct 13 with the chamber 5 of the first quadrant Q1

The elastomeric bearing 1 illustrated in FIG. 1 operates as follows:

In the event of a load parallel to the Z-axis, which is indicated by an arrow 17, for example, the inner sleeve 3 is adjusted upwardly relative to the outer sleeve 2. At the same time, the volumes of the chambers 6 and 7 are reduced, whereas the volumes of the chambers 5 and 8 are simultaneously increased. Damping medium may flow from the chamber 6 into the chamber 5 via the second throttle duct 14, whereas damping medium flows from the chamber 7 into the chamber 8 via the fourth throttle duct 16. By virtue of the configuration of the throttle ducts 14 and 16, the exchange of damping medium occurs in a correspondingly throttled or damped manner, so that the adjusting movement between the inner sleeve 3 and the outer sleeve 2 is also damped correspondingly.

In the event of a load on the elastomeric bearing 1 parallel to the X-axis, which is indicated by an arrow 18, for example, the volumes of the chambers 5 and 6 are reduced, whereas the volumes of the chambers 7 and 8 increase simultaneously. The exchange of damping medium occurs via the first throttle duct 13 and via the third throttle duct 15. A transmission of force or a transmission of movement between the two sleeves 2 and 3 is damped correspondingly as a function of the throttling action of the throttle ducts 13 and 15. The two axial directions Z and X represent the main working directions of the elastomeric bearing 1. Relative adjustments which have both components parallel to the Z-axis and components parallel to the X-axis are damped correspondingly. Thus, all forces which act on the elastomeric bearing 1 or relative movements which occur between the sleeves 2 and 3 are damped as soon as one of the associated direction components is in the XZ-plane.

According to an example embodiment of the present invention, the throttle ducts 14 and 16 active for achieving the damping action in the direction of the Z-axis may have different throttling resistances from those of the throttle-ducts 13 and 15 active for achieving damping in the direction of the X-axis. A two-dimensional damping behavior of the elastomeric bearing 1 suitable for the respective application can be implemented in this manner.

As illustrated in FIG. 2, the chambers 5 to 8 may also communicate with one another via throttle ducts 19 and 20 so that chambers 5 and 7 or 6 and 8 located diametrically opposite one another with respect to their quadrants Q1 to Q4 are coupled to one another.

The example embodiment of the present invention illustrated in FIG. 2 operates as follows:

In the event of a load parallel to the Z-axis in the direction of the arrow 17, for example, the volumes of the chambers 6 and 7 are reduced, whereas the volumes of the chambers 5 and 8 increase. A compensation of damping medium is possible via the throttle ducts 19 and 20, damping medium flowing out of the chamber 6 via the throttle duct 19 into the chamber 8, whereas damping medium flows out of the chamber 7 via the throttle duct 20 into the chamber 5.

In the event of a load parallel to the X-axis in the direction of the arrow 18, for example, the volumes of the chambers 5 and 6 are reduced, whereas the volumes of the chambers 7 and 8 increase. Correspondingly, damping medium flows out of the chamber 5 via the throttle duct 20 into the chamber 7 and from the chamber 6 via the throttle duct 19 into the chamber 8.

Any loading directions within the XZ-plane are possible, in order to obtain a damping action.

In the cross-sectional view illustrated in FIG. 3, the cross-sectional plane is rotated through 90° with respect to the Z-axis in relation to the views illustrated in FIGS. 1 and 2. Accordingly, a Y-axis is arranged in the drawing plane of FIG. 3. As illustrated in FIG. 3, the chambers 5 to 8 do not extend into the YZ-plane formed in FIG. 3 by the drawing plane, so that loads which have only a component parallel to the Y-axis are not damped hydraulically, but are damped merely as a result of the deformation of the elastic block 4.

A load of this type, extending only in the direction of the X-axis, is indicated in FIG. 3 by an arrow 21.

It may also be understood from FIG. 3 that the inner sleeve 3 need not have a rotationally symmetrical construction.

The elastomeric bearing 1 according to the present invention is also suitable for use as a single-point mounting, in which the Y-axis serves as the axis of rotation. Because the chambers 5 to 8 may communicate with one another, as illustrated in FIG. 1, rotational adjustment between the sleeves 2 and 3 about the Y-axis may also result in a hydraulically damped change in volume in the chambers 5 to 8. In such an application, a sufficient damping action may be achieved.

Such rotational adjustment is indicated in FIG. 3 by a curved double arrow 22.

The throttle ducts 13, 14, 15, 16 (FIG. 1) and 19, 20 (FIG. 2) are illustrated merely schematically by broken lines, in order to explain the coupling of the individual chambers 5, 6, 7, 8. The throttle ducts 13, 14, 15, 16 and 19, 20 may be implemented in any other suitable manner. For example, the ducts may be formed in the inner sleeve 3. The throttle ducts may extend within the block 4. The throttle ducts may also be formed in the outer sleeve (2). Furthermore, it is possible to arrange between the block 4 and the inner sleeve 3 or between the block 4 and the outer sleeve 2 an intermediate sleeve in which the throttle ducts are formed. The throttle ducts may be formed in a separate molding which is produced, for example, from plastic and is embedded into the block 4. The abovementioned alternative configurations of the throttle ducts may also be combined.

What is claimed is:

1. A hydraulically damping elastomeric bearing for a mounting of a motor vehicle, comprising:

an outer sleeve;

an inner sleeve arranged coaxially to the outer sleeve;

an elastic block arranged between the outer sleeve and the inner sleeve, the elastic block elastically connecting the outer sleeve and the inner sleeve;

four chambers arranged in one plane, each chamber being arranged in a respective one of four quadrants formed by a first axis and a second axis arranged in the plane and intersecting; and at least two throttle ducts;

wherein, via the at least two throttle ducts, at least one chamber disposed on a first side of the first axis communicates with at least one chamber disposed on a second side of the first axis and at least one chamber disposed on a first side of the second axis communicates with at least one chamber disposed on a second side of the second axis.

2. The elastomeric bearing according to claim 1, wherein each chamber disposed on the first side of the first axis and the first side of the second axis communicates via a first throttle duct with a chamber disposed on the first side of the first axis and the second side of the second axis and communicates via a second throttle duct with a chamber disposed on the second side of the first axis and the first side of the second axis.

3. The elastomeric bearing according to claim 2, wherein the first throttle duct and the second throttle duct have different throttling resistances.

4. The elastomeric bearing according to claim 1, wherein each chamber disposed on the first side of the first axis and the first side of the second axis communicates via one of the throttle ducts with a chamber disposed on the second side of the first axis and the second side of the second axis.

5. The elastomeric bearing according to claim 1, wherein the first axis and the second axis are perpendicular.

6. The elastomeric bearing according to claim 1, wherein the chambers are arranged mirror-symmetrically with respect to at least one of the first axis and the second axis.

7. The elastomeric bearing according to claim 1, wherein one of the first axis and the second axis is arranged coaxially to the inner sleeve and the outer sleeve.

8. The elastomeric bearing according to claim 1, wherein the chambers are arranged to extend substantially in a direction of an angle bisecting line of the respective quadrant.

9. The elastomeric bearing according to claim 1, wherein the inner sleeve includes at least one axial end portion having an outer contour, an outer cross-section of the outer contour increasing radially outwardly.

10. The elastomeric bearing according to claim 9, wherein the outer contour has a conical configuration.

11. The elastomeric bearing according to claim 9, wherein the outer contour delimits at least one of the chambers.

12. The elastomeric bearing according to claim 1, wherein at least one of throttle ducts is formed in at least one of: the inner sleeve; the elastic block; the outer sleeve; an intermediate sleeve arranged between the elastic block and one of the inner sleeve and the outer sleeve; and a molding embedded into the elastic block.

* * * * *